US009657895B2

(12) United States Patent
Chen

(10) Patent No.: US 9,657,895 B2
(45) Date of Patent: May 23, 2017

(54) ROTATABLE SUPPORTING FRAME

(71) Applicant: SYNCMOLD ENTERPRISE CORP., New Taipei (TW)

(72) Inventor: Tung-Chiung Chen, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 14/830,311

(22) Filed: Aug. 19, 2015

(65) Prior Publication Data

US 2016/0069510 A1 Mar. 10, 2016

(30) Foreign Application Priority Data

Sep. 4, 2014 (TW) .............................. 103215779 U

(51) Int. Cl.
| A47B 97/04 | (2006.01) |
| F16M 13/02 | (2006.01) |
| F16B 1/00 | (2006.01) |
| F16C 11/04 | (2006.01) |
| F16C 11/10 | (2006.01) |
| G06F 1/16 | (2006.01) |
| F16M 11/08 | (2006.01) |
| G07G 1/01 | (2006.01) |
| G07G 1/00 | (2006.01) |

(52) U.S. Cl.
CPC .............. *F16M 13/022* (2013.01); *F16B 1/00* (2013.01); *F16C 11/04* (2013.01); *F16C 11/10* (2013.01); *F16M 11/08* (2013.01); *F16M 13/02* (2013.01); *G06F 1/1607* (2013.01); *G07G 1/01* (2013.01); *F16B 2001/0035* (2013.01); *G07G 1/0018* (2013.01)

(58) Field of Classification Search
CPC .... F16B 1/00; F16B 2001/0035; F16C 11/04; F16C 11/10; F16C 11/08; F16M 13/02; F16M 13/022; F16M 11/08; G06F 1/1607; G07G 1/01
USPC ......... 248/206.5, 349.1, 415, 458, 521, 522, 248/917

See application file for complete search history.

(56) References Cited

U.S. PATENT DOCUMENTS

| 6,663,073 | B1 * | 12/2003 | Church .................. | A47B 97/08 248/458 |
| 7,862,197 | B2 * | 1/2011 | Gebhard ................. | B60Q 1/24 248/206.5 |
| 8,706,175 | B2 * | 4/2014 | Cho ..................... | F16M 11/041 248/205.1 |
| 2013/0303000 | A1 * | 11/2013 | Witter ................ | H01R 13/6205 439/39 |

FOREIGN PATENT DOCUMENTS

| CN | 2424103 Y | 3/2001 |
| CN | 201897927 U | 7/2011 |

* cited by examiner

*Primary Examiner* — Gwendolyn Baxter
(74) *Attorney, Agent, or Firm* — Muncy, Geissler, Olds & Lowe, P.C.

(57) ABSTRACT

A rotatable supporting frame comprising a baseplate structure, a frame body and a magnetic module is provided. The frame body is capable of being rotated with respect to the baseplate structure when a user adjusts the direction of a display module which connects to the frame body. The magnetic module is disposed on the baseplate structure to firmly attach the baseplate structure onto a magnetic board through the magnetic force formed between the magnetic module and the magnetic board.

11 Claims, 3 Drawing Sheets

ROTATABLE SUPPORTING FRAME

This application claims the benefit of the priority to Taiwan Patent Application No. 103215779 filed on Sep. 4, 2014, the disclosures of which are incorporated herein by reference in their entirety.

CROSS-REFERENCES TO RELATED APPLICATIONS

Not applicable.

BACKGROUND OF THE INVENTION

Field of the Invention

The present invention relates to a supporting frame, more particularly, to a rotatable supporting frame that supports a display module.

Descriptions of the Related Art

An existing cash register usually includes two display modules, wherein one faces the casher and the other faces the customer. Such arrangement allows the casher and the consumer to confirm sales details and amounts before a receipt is printed. However, having two display modules in each cash register is costly and thus many markets and retail stores exclude this kind of cash register with two display modules due to cost concerns.

Therefore, it is desirable to provide a rotatable supporting frame that allows quick and easy adjustment of single display module towards different directions in the aforementioned industry.

SUMMARY OF THE INVENTION

The objective of the present invention is to provide a rotatable supporting frame. When a display module is disposed and attached to the rotatable supporting frame, the display module along with the rotatable supporting frame can be rotated so that the display module is adjusted to face a cashier or a customer as desired.

Another objective of the present invention is to provide a rotatable supporting frame which is capable of being attached to a magnetic or metallic surface by using a magnetic module. The rotatable supporting frame is particularly suitable for metallic table tops of common cashier tables in the markets and the retail stores without any further modifications to the tables.

To achieve aforementioned objectives, the present invention provides a rotatable supporting frame including a baseplate structure, a frame body and a magnetic module, and being operatably disposed on a magnetic board. In one embodiment, the frame body includes a bottom member and a rotating shaft which is disposed on the bottom member. The baseplate structure includes a shaft hole allowing the rotating shaft rotatably disposed therein so that the frame body is capable of rotating with respect to the baseplate structure. The magnetic module is disposed on the baseplate structure. The frame body is capable of being optionally rotated with respect to said baseplate structure through the magnetic force formed between said magnetic module and the magnetic board when said baseplate structure is secured onto the magnetic board.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
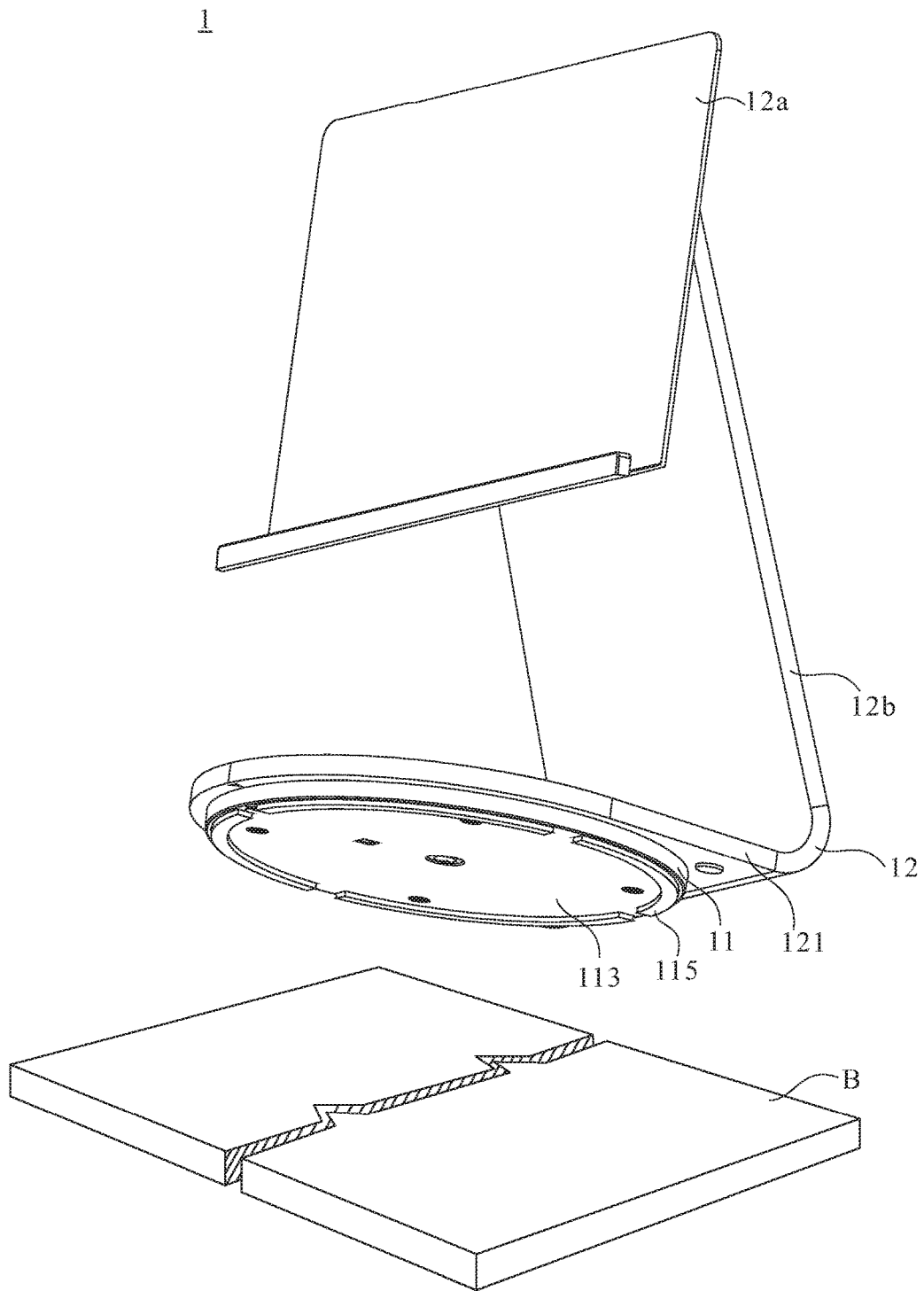
FIG. 1 is a perspective view illustrating the rotatable supporting frame of the present invention.
Figure 2:
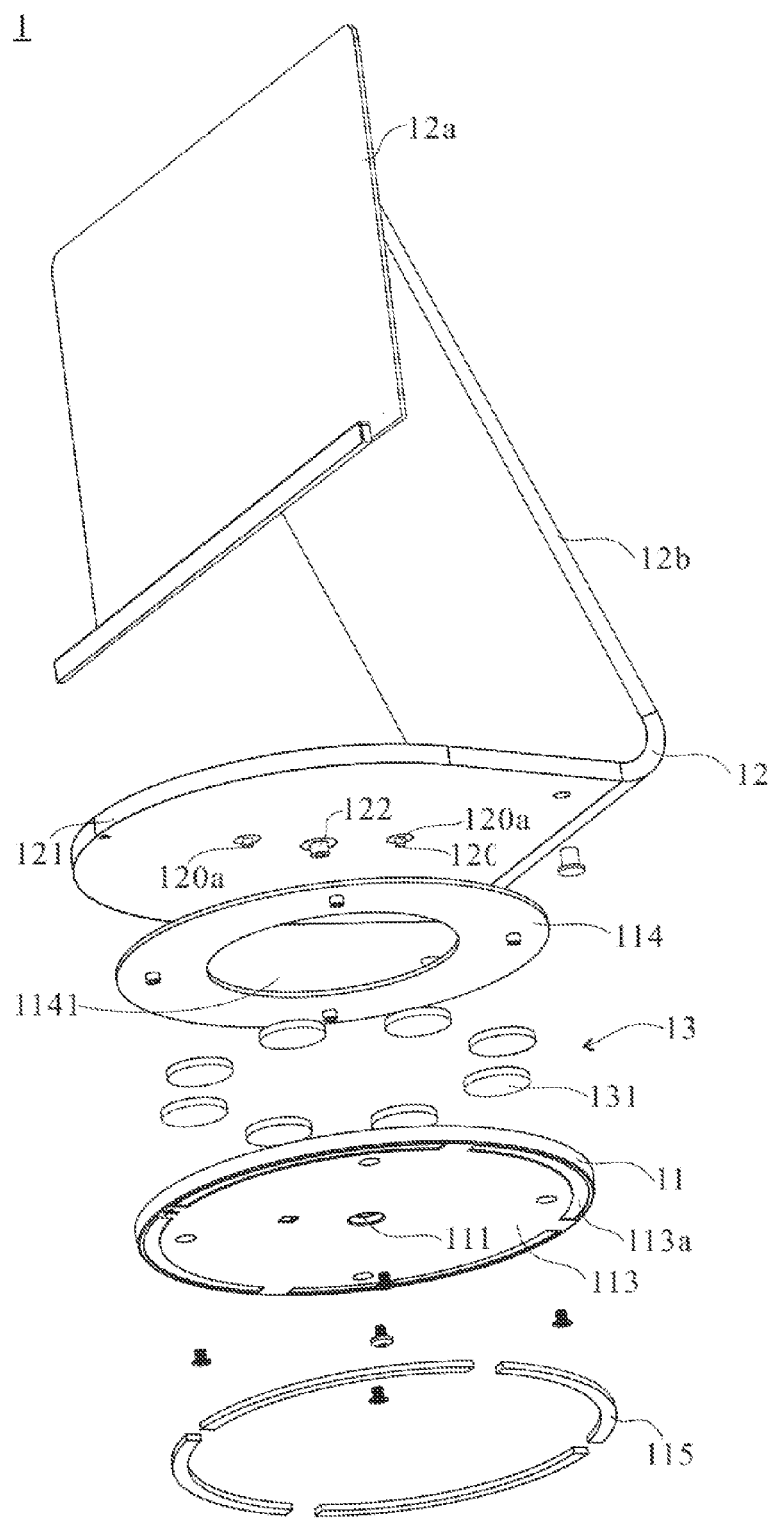
FIG. 2 is a perspective exploded view illustrating the rotatable supporting frame of the present invention.
Figure 3:
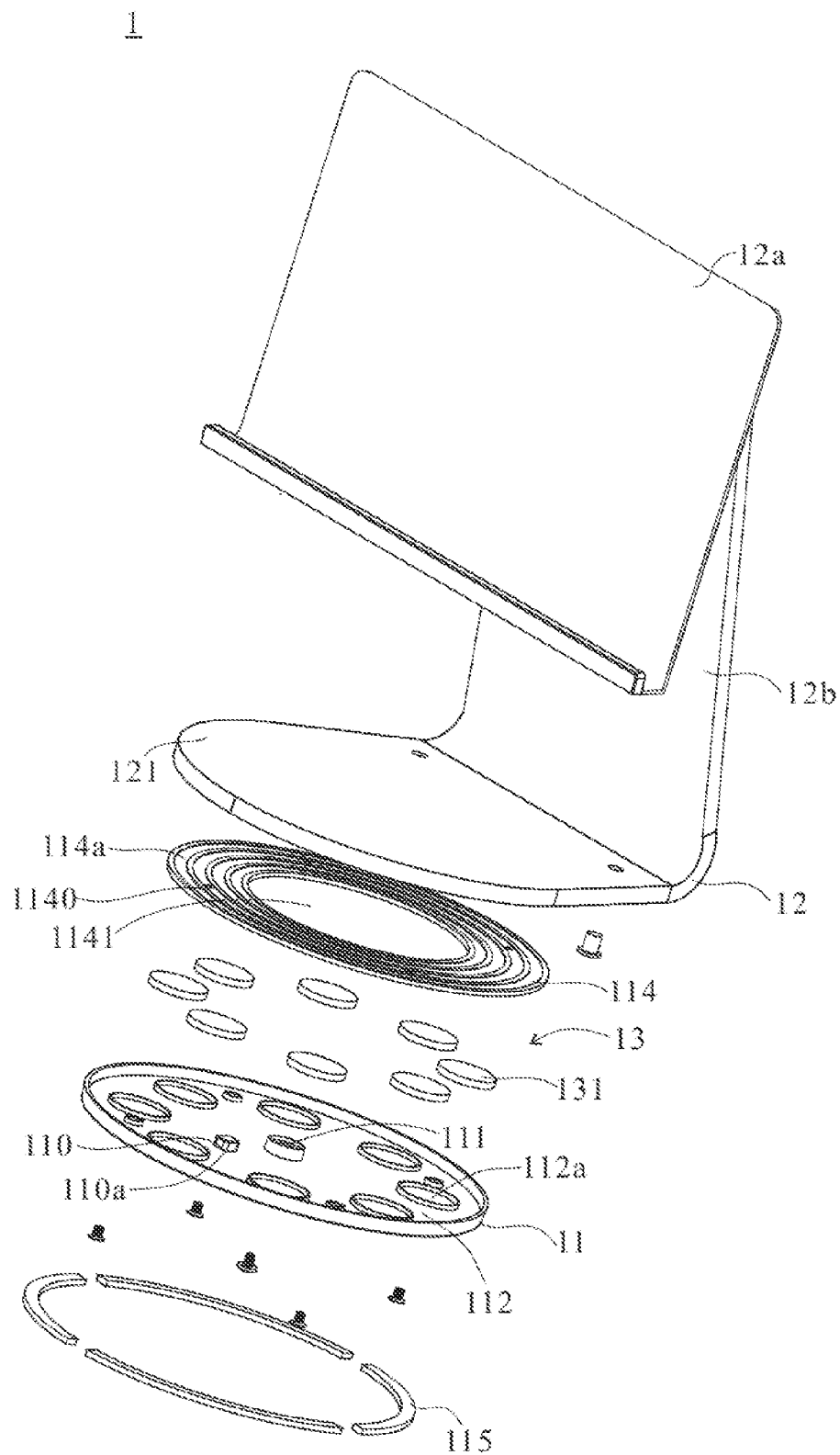
FIG. 3 is another perspective exploded view illustrating the rotatable supporting frame of the present invention.

Please refer to FIG. 1, FIG. 2 and FIG. 3. FIG. 1 is a perspective view of the rotatable supporting frame 1 of the present invention, FIG. 2 is a perspective exploded view of the rotatable supporting frame 1 of the present invention, and FIG. 3 is another perspective exploded view of the rotatable supporting frame 1 of the present invention. The rotatable supporting frame 1 is utilized to support a display module (not shown) on a metallic platform (not shown). The rotatable supporting frame 1 includes a baseplate structure 11, a frame body 12 and a magnetic module 13. The metallic platform may be a magnetic board B allowing the magnetic module 13 to attach thereto. It is noted that the magnetic module 13 is able to generate magnetic fields to attract magnetic materials such as iron, nickel, cobalt and etc. In other words, the aforementioned magnetic board B is defined as any objects attracted by the magnetic module 13, such as aforementioned metallic platform.

The frame body 12 is rotatably disposed on the baseplate structure 11. The magnetic module 13 is disposed on the baseplate structure 11. When the baseplate structure 11 is secured onto the magnetic board B, the frame body 12 may optionally and relatively rotate with respect to the baseplate structure 11 through the magnetic force formed between the magnetic module 13 and the magnetic board B. Therefore, the rotatable supporting frame 1 of the present invention is operatably disposed on the magnetic board B such as a metallic plate made of iron or other metallic materials. The baseplate structure 11 is attached onto the magnetic board B through the magnetic force formed between the magnetic module 13 and the magnetic board B.

Since the conventional casher counters in most markets and retail stores usually include iron platforms or metallic counter tops that may act as magnetic boards, no further modifications to these iron platforms or metal counter tops are required because the rotatable supporting frame 1 is able to be attached onto the iron platforms or metal counter tops through the magnetic force generated between the magnetic module 13 and the iron platforms or metal counter tops.

In this embodiment, with reference to FIG. 2 and FIG. 3, the baseplate structure 11 includes a shaft hole 111, and the frame body 12 includes a bottom member 121, a rotating shaft 122 disposed on the bottom member 121, a receiving member 12a and a standing member 12b. The standing member 12b connects the receiving member 12a and bottom member 121, and the receiving member 12a is capable of connecting to a display module (not shown in figures). The shaft hole 111 of the baseplate structure 11 allows the rotating shaft 122 to be rotatably disposed therethrough and hence allows the frame body 12 to relatively rotate with respect to the baseplate structure 11. Therefore, the display module may rotate together with the frame body 12 and the direction of the display module can be optionally adjusted. For example, the display module may be easily rotated to face in the direction towards the casher or in the direction towards the customer.

However, in other embodiments of the present invention, the frame body 12 may not have a rotating shaft, and thus the baseplate structure 11 may not have a shaft hole for a nonexistent rotating shaft. The frame body 12 may still be able to relatively rotate with respect to the base plate structure 11. For example, in other embodiments of the present invention, the bottom member 121 of the frame body 12 may be a covering member rotatably covering the baseplate structure 11 to achieve the same effect of the frame body 12 relatively rotating with respect to the baseplate structure 11.

Furthermore, in this embodiment of the present invention with reference to FIG. 1, the standing member 12b and bottom member 121 are formed in one piece. In order to have stable rotation of the frame body 12 with respect to the baseplate structure 11 and avoid wobbling while rotating due to insufficient weight of the frame body 12, the frame body 12 could be a metallic piece or a casting piece so that the frame body 12 may maintain a sufficient weight. Aside from attaching to the magnetic board B on a table, the rotatable supporting frame 1 of the present invention may also be attached to a magnetic board on a wall when required. In this case, the frame body 12 being made of materials with lighter weight and non-magnetic may be considered and not limited to the abovementioned materials.

In this embodiment, the frame body 12 is a magnetic piece such as the aforementioned metallic piece or casting piece. Therefore, as shown in FIG. 2 and FIG. 3, the baseplate structure 11 further includes a magnetic insulating plate 114 for avoiding the magnetic module 13 from attaching to the frame body 12 and resulting an unsmooth rotation of the frame body 12. It is preferred that the magnetic insulating plate 114 is a hollow annular plate disposed between the bottom member 121 and the magnetic module 13 to insulate the magnetic force between the magnetic module 13 and the frame body 12. The rotating shaft 122 of the frame body 12 penetrates through a center opening 1141 of the magnetic insulating plate 114 and is disposed in the shaft hole 111 of the baseplate structure 11. The magnetic module 13 is disposed on the circumference of the baseplate structure 11 and away from the rotating shaft 122 to avoid causing unsmooth rotation of the rotating shaft 122 due to the magnetic force from the magnetic module 13.

In other embodiments of the present invention, the baseplate structure 11 may not include magnetic insulating plate 114. For example, the magnetic module 13 and the bottom member 121 may be kept apart in a distance if the frame body 12 is magnetic. The distance minimizes the magnetic force between the frame body 12 and the magnetic module 13, and allows the frame body 12 to relatively rotate with respect to the baseplate structure 11. In other embodiments of the present invention, the magnetic insulating plate may be omitted if the frame body 12 is made of non-magnetic and lighter materials, because the bottom member 121 of the frame body 12 is already magnetic insulating.

For reducing frictions between the bottom member 121 and the magnetic insulating plate 114, as shown in FIG. 3, the magnetic insulating plate 114 may include a plurality of grooves 114a formed on the upper surface 1140 of the magnetic insulating plate 114 so as to reduce the friction surface area for a smoother rotation of the frame body 12. The number of the grooves 114a is not restricted in the embodiments of the present invention. The magnetic insulating plate 114 may only include one groove 114a according to the requirements, and still achieve the purpose of reducing the friction surface area.

In this embodiment, the magnetic insulating plate 114 may be made of abrasion resistant materials, e.g. fiber reinforced plastics, to reduce wear and abrasion thereof However, other abrasion resistant materials may be applied in other embodiments of the present invention and not restricted.

The structure of the magnetic module 13 is explained in detailed herefrom. With reference to FIG. 2 and FIG. 3, the magnetic module 13 includes a plurality of magnetic units 131 disposed with intervals on the upper surface 112 of the baseplate structure 11 in this embodiment. The baseplate structure 11 includes a plurality of first slots 112a formed on the upper surface 112 and the magnetic units 131 are respectively fitted therein. Aside from being held by frictional force, the magnetic module 13 may also be adhered to the baseplate structure 11 in other embodiments of the present invention. Alternatively, the baseplate structure 11 itself may be magnetic so that the magnetic module 13 is magnetically attached thereto. Persons of ordinary skill in the art shall be able to alter aforementioned structures and arrangements to achieve similar effects. Therefore, methods of attaching the magnetic module 13 to the baseplate structure 11 are not limited. Furthermore, the magnetic module 13 may also be disposed on the lower surface of the baseplate structure 11 to achieve more direct and better attachment effects.

With reference to FIG. 2 and FIG. 3, the frame body 12 further includes a first stopper structure 120, and the baseplate structure 11 further includes a second stopper structure 110. The first stopper structure 120 and the second stopper structure 110 are both disposed in the center opening 1141 of the magnetic insulating plate 114. When the frame body 12 relatively rotates to an angle with respect to the baseplate structure 11, the first stopper structure 120 and the second stopper structure 110 abut with each other to restrict the rotating angle of the frame body 12 with respect to the baseplate structure 11.

Since the casher is generally facing the customer on an opposite side of a casher counter, the casher needs to have the display module facing him/her while registering a sale and to have the display module facing the customer when the sale is registered. In other words, the casher needs to rotate the frame body 12 at the angle within 180 degrees so that facing direction of the display module is adjusted from the casher to the customer to enable the customer to confirm the sales details on the display module. In this embodiment, the first stopper structure 120 has two first stopper columns 120a and the second stopper structure 110 has a second stopper column 110a, in which the two first stopper columns 120a are aligned in a straight line. Hence the two first stopper columns 120a alternatively contact with the second stopper column 110a when the frame body 12 relatively rotates with respect to the baseplate structure 11. The frame body 12 is rotated in an angle slightly smaller than 180 degrees so that the casher or the customer may swiftly rotate the display module in front of him/her.

In other embodiments of the present invention, the first stopper structure 120 may have only one first stopper column 120a and the second stopper structure 110 may have two second stopper columns 110a, in which the two second stopper columns 110a may be aligned in a straight line and still achieve the same effect of rotation angle control. Persons of ordinary skill of the art shall be able to alter the numbers and positions of the stopper columns to adapt to different displaying and rotating angles required. Therefore, the numbers and the positions of the first stopper columns 120a and second stopper columns 110a are not restricted.

Still with reference to FIG. 2 and FIG. 3, the baseplate structure 11 includes a plurality of spacers 115, and the lower surface 113 is formed with a plurality of second slots 113a. The spacers 115 are respectively held in the second slots 113a with frictions, hence preventing damages caused by direct bumping between the baseplate structure 11 and the magnetic board B when the rotatable supporting frame 1 is placed on the magnetic board B. The spacers 115 are made of rubber in the embodiment, but other buffering materials may be used in other embodiments of the present invention and not restricted thereof.

To conclude, through the relative rotation of the frame body 12 with respect to the baseplate structure 11, the rotatable supporting frame 1 of the present invention may enable the display module on the frame body 12 to face either the casher or the customer. Comparing to the conventional cash register, the combination of the rotatable supporting frame 1 and the cash register only requires one display module. Hence the required number of display modules is effectively reduced and the manufacturing cost is lowered. In addition, the rotatable supporting frame 1 is attached to the magnetic board B using the magnetic module 13 so that the markets and the retail stores do not need any further modifications to existing casher counters and therefore no damages will be performed to any counters and surfaces. The willingness of markets and retail stores to adapt to the rotatable supporting frame 1 of the present invention is greatly improved.

The above disclosure is related to the detailed technical contents and inventive features thereof People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A rotatable supporting frame, operatably disposed on a magnetic board, the rotatable supporting frame comprising:
   a baseplate structure including a shaft hole;
   a frame body rotatably disposed on said baseplate structure, said frame body including a bottom member and a rotating shaft disposed on said bottom member; and
   a magnetic module disposed on said baseplate structure, wherein said shaft hole allows said rotating shaft disposed therethrough so that said frame body is capable of being rotated with respect to said baseplate structure through magnetic force formed between said magnetic module and the magnetic board when said baseplate structure is secured onto the magnetic board.

2. The rotatable supporting frame as claimed in claim 1, wherein said baseplate structure further includes a magnetic insulating plate disposed between said bottom member and said magnetic module.

3. The rotatable supporting frame as claimed in claim 2, wherein said frame body further includes a first stopper structure and said baseplate structure further includes a second stopper structure, said first stopper structure and said second stopper structure abutting with each other when said frame body relatively rotates to an angle with respect to said baseplate structure.

4. The rotatable supporting frame as claimed in claim 3, wherein said first stopper structure includes two first stopper columns, and said second stopper structure includes a second stopper column.

5. The rotatable supporting frame as claimed in claim 3, wherein said first stopper structure includes a first stopper column, and said second stopper structure includes two second stopper columns.

6. The rotatable supporting frame as claimed in claim 3, wherein said angle is smaller than 180 degrees.

7. The rotatable supporting frame as claimed in claim 2, wherein said magnetic insulating plate includes at least one groove.

8. The rotatable supporting frame as claimed in claim 1, wherein said magnetic module includes a plurality of magnetic units disposed with intervals on an upper surface of said baseplate structure.

9. The rotatable supporting frame as claimed in claim 8, wherein said upper surface of said baseplate structure includes a plurality of first slots for said magnetic units being respectively fitted therein.

10. The rotatable supporting frame as claimed in claim 1, wherein the baseplate structure further includes a plurality of spacers, and a lower surface of said baseplate structure includes a plurality of second slots for said spacers being respectively fitted therein.

11. The rotatable supporting frame as claimed in claim 1, wherein said frame body includes a receiving member and a standing member connecting with said receiving member and said bottom member, in which said receiving member is capable of being connected to a display module, and said standing member and said bottom member are formed in one piece.

* * * * *